(12) United States Patent
Ishida et al.

(10) Patent No.: US 9,845,157 B2
(45) Date of Patent: Dec. 19, 2017

(54) AIRCRAFT EQUIPMENT COOLING

(71) Applicant: MITSUBISHI AIRCRAFT CORPORATION, Aichi (JP)

(72) Inventors: Toshiyuki Ishida, Tokyo (JP); Yoichi Uefuji, Tokyo (JP); Masatoshi Morishita, Tokyo (JP); Gento Ichikawa, Tokyo (JP); Yasunari Tanaka, Aichi (JP); Fumio Kondo, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 168 days.

(21) Appl. No.: 14/980,217

(22) Filed: Dec. 28, 2015

(65) Prior Publication Data
US 2016/0244171 A1 Aug. 25, 2016

(30) Foreign Application Priority Data

Feb. 25, 2015 (JP) .................................. 2015-35479

(51) Int. Cl.
*B64C 1/00* (2006.01)
*B64D 13/08* (2006.01)
*B64D 13/06* (2006.01)

(52) U.S. Cl.
CPC ...... *B64D 13/08* (2013.01); *B64D 2013/0614* (2013.01)

(58) Field of Classification Search
CPC . B64D 2013/0614; B64F 13/006; B64F 13/08
See application file for complete search history.

(56) References Cited

U.S. PATENT DOCUMENTS

| 4,739,823 | A | * | 4/1988 | Howard | B64D 13/00 165/104.34 |
|---|---|---|---|---|---|
| 4,819,720 | A | * | 4/1989 | Howard | B64D 13/00 165/104.34 |
| 5,253,484 | A | * | 10/1993 | Corman | B64D 13/00 454/76 |
| 5,474,120 | A | * | 12/1995 | Severson | H05K 7/20209 165/296 |
| 6,159,091 | A | * | 12/2000 | Horstman | B64D 13/00 454/76 |
| 2011/0212677 | A1 | * | 9/2011 | Dooley | B64D 13/00 454/74 |

FOREIGN PATENT DOCUMENTS

JP H06-8889 A 1/1994

* cited by examiner

*Primary Examiner* — Richard G Davis
(74) *Attorney, Agent, or Firm* — Pearne & Gordon LLP

(57) ABSTRACT

An aircraft includes: a cockpit, the inside of which is pressurized; equipment which is at least partially disposed on the outside of the cockpit (external space) where the pressure is lower than the inside of the cockpit (internal space); a forced air delivery mechanism which discharges air from a peripheral space of the equipment on the outside of the cockpit by an exhaust fan to supply a branch flow divided from a main flow of air-conditioning exhaust, which has air-conditioned the inside of the cockpit, as cooling air to the equipment; and a natural air delivery mechanism which uses a differential pressure between the inside of the cockpit and the outside of the cockpit to supply air inside the cockpit as cooling air to the equipment through a ventilation opening putting in communication the peripheral space and the inside of the cockpit with one another.

10 Claims, 2 Drawing Sheets

AIRCRAFT EQUIPMENT COOLING

BACKGROUND OF THE INVENTION

Field of the Invention

The present invention relates to a mechanism for cooling equipment installed in the cockpit of an aircraft.

Description of the Related Art

In the cockpit of an aircraft, a display device which displays information required for flight is installed. A monitor unit of the display device is disposed inside the cockpit, and a control unit of the display device is disposed outside the cockpit.

To cool the display device which generates heat as it operates, a built-in fan of the display device discharges heat inside the display device to the outside of the casing, while an exhaust fan disposed outside the cockpit discharges air around the display device to the outside of the cockpit. The exhaust fan is operated to supply a part of air, which is discharged to the outside of the cockpit after air-conditioning the inside of the cockpit, as cooling air to the display device.

Japanese Patent Laid-Open No. 6-8889 describes a device which distributes cooling air produced by an air-conditioning device to a plurality of pieces of electronic equipment.

The cooling mechanism as described above, which discharges air around the display device to the outside of the cockpit by the exhaust fan in order to supply exhaust of air-conditioning air inside the cockpit to the display device, loses its function if the exhaust fan breaks down due to failure.

Even if the built-in fan of the display device is operating at that time, since the exhaust fan is down, air discharged from the casing is immediately suctioned by the built-in fan (short-circuit), which results in a temperature rise of the display device due to heat retained around the device. It is necessary to avoid failure due to a temperature rise of the display device which displays information directly linked to safe flight.

Therefore, the present invention aims to secure a flow of air for cooling equipment fitted in the cockpit of an aircraft below its allowable temperature even if the mechanism for cooling the equipment malfunctions.

SUMMARY OF THE INVENTION

An aircraft of the present invention includes: a cockpit, the inside of which is pressurized; equipment which is at least partially disposed on the outside of the cockpit where the pressure is lower than the inside of the cockpit; a forced air delivery mechanism which discharges air from a peripheral space of the equipment on the outside of the cockpit by an exhaust fan in order to supply a branch flow divided from a main flow of air-conditioning exhaust, which has air-conditioned the inside of the cockpit, as cooling air to the equipment; and a natural air delivery mechanism which uses a differential pressure between the inside of the cockpit and the outside of the cockpit to supply air inside the cockpit as cooling air to the equipment through a ventilation opening putting in communication the peripheral space and the inside of the cockpit with one another.

Even if the forced air delivery mechanism malfunctions as a result of failure of the exhaust fan etc., air is delivered to the equipment by the natural air delivery mechanism.

It is preferable that the aircraft of the present invention further includes a flow passage which connects the main flow and the peripheral space with each other, and that, when the exhaust fan is operating, the branch flow divided from the main flow flows through the flow passage and, when the exhaust fan is down, air in the peripheral space flows through the flow passage toward the main flow.

In the aircraft of the present invention, it is preferable that the main flow flows toward an underfloor space which is on the outside of the cockpit, and that the branch flow flows via the peripheral space into the underfloor space where the exhaust fan is located.

In the aircraft of the present invention, it is preferable that the ventilation opening is located at a level lower than half the height of the inside of the cockpit.

In the aircraft of the present invention, it is preferable that the equipment includes a cooling fan which discharges heat of the equipment to the peripheral space.

In the aircraft of the present invention, it is preferable that the ventilation opening is located in the vicinity of a suction opening of the equipment through which air is suctioned from the peripheral space by the cooling fan.

It is preferable that the object to be cooled by the present invention is a display device which displays information required for flight of the aircraft.

According to the present invention, even if the mechanism for cooling the equipment fitted in the cockpit malfunctions, it is possible to secure a flow of air for cooling the equipment below its allowable temperature by the natural air delivery mechanism. Thus, the reliability of the aircraft can be enhanced.

DETAILED DESCRIPTION OF THE PREFERRED EMBODIMENT

In the following, an aircraft according to an embodiment of the present invention will be described with reference to the accompanying drawings.

Figure 1:
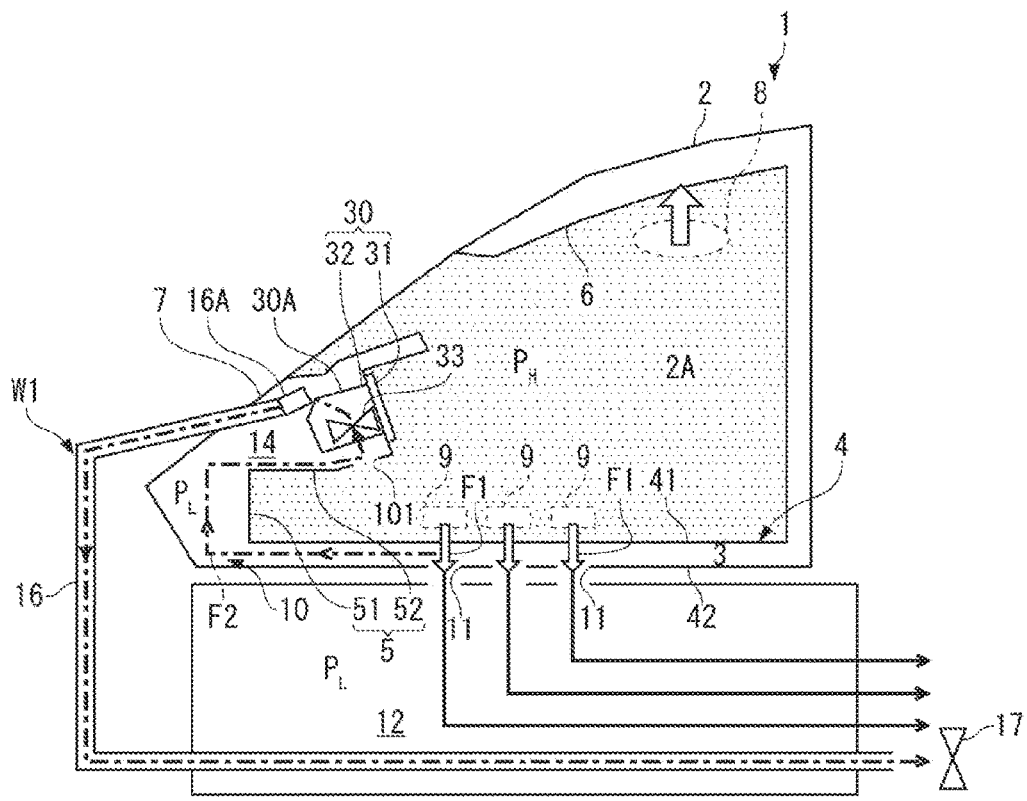
FIG. 1 is a schematic view showing a route in which air having air-conditioned the inside of a cockpit of an aircraft of the present invention is discharged (solid arrows), and a route of a forced air delivery mechanism delivering air to a display device installed in the cockpit (dot-and-dash arrows)

An internal space 2A of a cockpit 2 of an aircraft 1 shown in FIG. 1 is pressurized, air-conditioned, and ventilated by an air-conditioning device installed in an equipment chamber (not shown).

The internal space 2A of the cockpit 2 is defined by a floor 4 on which a seat (not shown) for a pilot to sit on is installed, a wall 5 rising from the floor 4, and a ceiling 6 continuous with the wall 5.

An external space 3 is formed between a skin 7 of the cockpit 2 on one side and the floor 4, the wall 5, and the ceiling 6 on the other side. A pressure $P_L$ of the external space 3 is lower than a pressure $P_H$ of the internal space 2A.

The pressure $P_H$ of the internal space 2A is kept to be higher than the pressure $P_L$ of the external space 3 to thereby prevent smoke etc. generated outside the cockpit 2 from flowing into the internal space 2A.

The pressure $P_L$ of the external space 3 is higher than an external air pressure on the outside of the skin 7.

Hereinafter, the internal space 2A may be referred to as the inside of the cockpit 2, and the external space 3 may be referred to as the outside of the cockpit 2.

The air-conditioning device produces air-conditioning air using bleed air from an engine of the aircraft as a heat source and a pressure source.

The cockpit 2 includes introduction ports 8 through which air-conditioning air sent from the air-conditioning device is introduced into the cockpit 2, and discharge ports 9 through which air having air-conditioned the inside of the cockpit 2 is discharged to the outside of the cockpit 2.

The introduction ports 8 are provided in the wall 5 and the ceiling 6.

The discharge ports 9 correspond to a clearance between the floor 4 and the wall 5 etc.

The floor 4 includes an upper panel 41, a lower panel 42 disposed under the upper panel 41, and a support member (not shown) supporting these panels 41, 42.

Between the upper panel 41 and the lower panel 42, there is a flow passage 10 which allows ventilation in the horizontal direction in which the panels 41, 42 extend. The flow passage 10 leads to the space between a portion of the wall 5 and the skin 7 located on the front side in the forward direction of the aircraft 1.

Air-conditioning air having blown out of the introduction ports 8 into the cockpit 2 circulates inside the cockpit 2 and air-conditions the inside of the cockpit 2. The air-conditioning air, which has its temperature lowered in the process, is suctioned into the discharge ports 9 due to the differential pressure ($P_H$–$P_L$) between the inside of the cockpit 2 and the outside of the cockpit 2.

The air-conditioning air discharged through the discharge ports 9 (hereinafter, air-conditioning exhaust) temporarily enters the flow passage 10 as indicated by the solid arrows in FIG. 1, and is guided to an underfloor space 12 under the floor 4 through airflow ports 11 provided in the lower panel 42. Then, the air-conditioning exhaust flows inside the underfloor space 12 toward the rear side, and is discharged to the outside of the aircraft through a valve (not shown) provided on a pressure bulkhead which separates between the inside and the outside of the aircraft.

The underfloor space 12 and the above-described flow passage 10 correspond to the external space 3 of the cockpit 2.

The cockpit 2 is equipped with a display device 30 which displays various pieces of information required for flight.

The display device 30 includes a monitor unit 31 which displays information for a pilot and a control unit 32 which controls display on the monitor unit 31, and heat is generated as the display device 30 operates.

The display device 30 is installed on the wall 5 of the cockpit 2.

The wall 5 includes an upright part 51 rising from the front end of the floor 4 and a backward part 52 extending backward from the upper end of the upright part 51.

The control unit 32 is disposed in a behind-the-wall space 14 formed between the backward part 52 and the skin 7 behind the backward part 52. The behind-the-wall space 14 communicates with the flow passage 10 which is formed from the space between the upright part 51 and the skin 7 to the space between the upper panel 41 and the lower panel 42 of the floor 4. This behind-the-wall space 14 also corresponds to the external space 3 of the cockpit 2.

A ventilation hole 101, which puts in communication the internal space 2A of the cockpit 2 and the behind-the-wall space 14 with one another, penetrates the backward part 52 in the thickness direction. This ventilation hole 101 is provided in case of malfunction of a forced air delivery mechanism W1 (to be described later) which forcibly delivers air to the display device 30.

It is preferable that the ventilation hole 101 is located at a level lower than half the height of the inside of the cockpit 2. In a lower part of the inside of the cockpit 2, air having a lower temperature than air in an upper part of the inside of the cockpit 2 is present.

Inside a casing 30A of the display device 30, a built-in fan 33 is disposed which suctions air from the behind-the-wall space 14 and discharges heat inside the display device 30 to the outside of the casing 30A. Air that has its temperature increased under heat emitted from parts inside the casing 30A moves upward and is discharged from an upper part of the casing 30A to the behind-the-wall space 14.

In the vicinity of an exhaust opening located in an upper part of the casing 30A, an exhaust port 16A is disposed which receives exhaust from the display device 30 into a duct 16.

The duct 16 is routed from the exhaust port 16A located in the behind-the-wall space 14 via the space between the wall 5 and the skin 7 to the underfloor space 12.

A suction opening through which air is suctioned from the behind-the-wall space 14 into the casing 30A is located in a lower part of the casing 30A. It is preferable that the above-mentioned ventilation hole 101 is located in the vicinity of this suction opening.

The display device 30 is cooled by the forced air delivery mechanism W1 which delivers a part of air-conditioning exhaust to the behind-the-wall space 14.

The forced air delivery mechanism W1 includes: the built-in fan 33 included in the display device 30; an exhaust fan 17 which discharges exhaust heat of the display device 30 to the underfloor space 12; the flow passage 10 communicating with the discharge ports 9, through which air-conditioning air is discharged, and the behind-the-wall space 14; and the duct 16 routed from the behind-the-wall space 14 to the underfloor space 12.

In FIG. 1, the air delivery route of the forced air delivery mechanism W1 is indicated by the dot-and-dash arrows.

When air is discharged from the behind-the-wall space 14 through the duct 16 into the underfloor space 12 by the exhaust fan 17 disposed in the underfloor space 12, as the behind-the-wall space 14 is depressurized, a part of a main flow F1 of air-conditioning exhaust (outlined arrows) is divided into the flow passage 10 and forms a branch flow F2, which is supplied to the display device 30. The branch flow F2 of the air-conditioning exhaust is suctioned by the built-in fan 33 from a lower part of the casing 30A and cools the display device 30, and is discharged from an upper part of the casing 30A and immediately suctioned into the duct 16 to be discharged to the underfloor space 12. Thereafter, as with the main flow F1 of the air-conditioning exhaust, the branch flow F2 flows through the underfloor space 12 toward the rear side and is discharged to the outside of the aircraft.

To prevent the display device 30, which is an important piece of equipment, from failing due to heat, the forced air delivery mechanism W1 maintains the temperature of the behind-the-wall space 14 below the allowable temperature of the display device 30 with a sufficient margin.

If the exhaust fan 17 breaks down due to failure, the forced air delivery mechanism W1 loses its function. If the exhaust fan 17 breaks down, as shown in FIG. 2, no branch flow F2 is divided from the main flow F1 of air-conditioning exhaust, so that no air is delivered to the display device 30.

Figure 2:
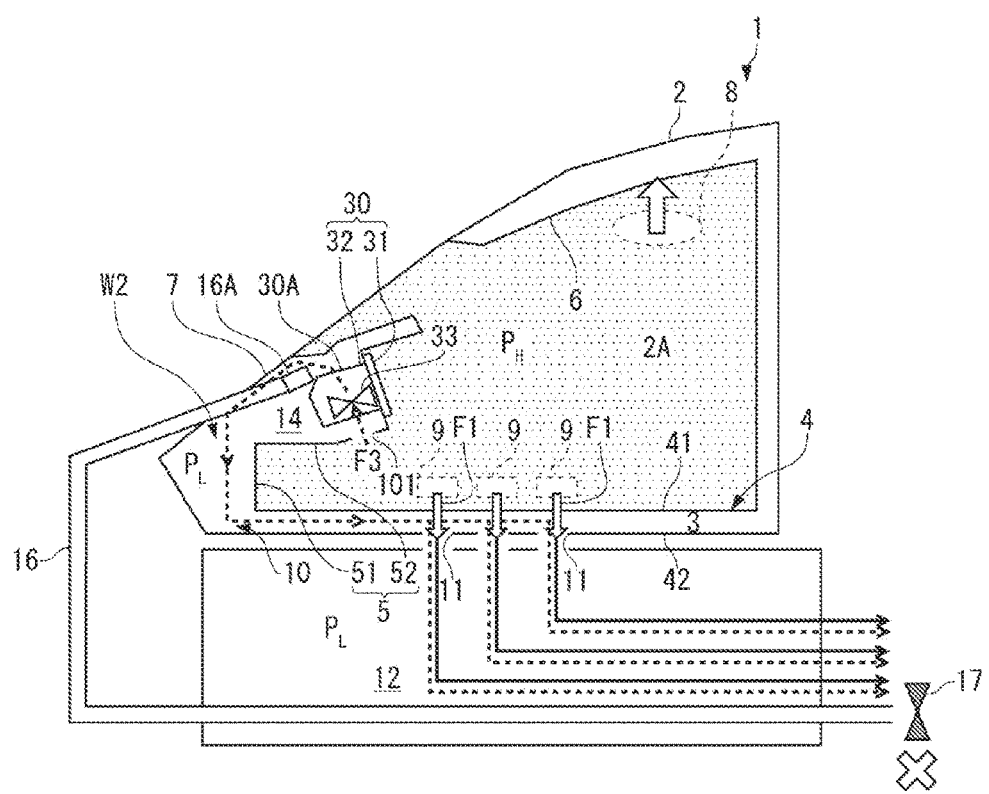
FIG. 2 is a schematic view showing a route of a natural air delivery mechanism delivering air to the display device even when the exhaust fan shown in FIG. 1 is down (dashed arrows).

Therefore, as shown in FIG. 2, the aircraft 1 includes a natural air delivery mechanism W2 including the above-described ventilation hole 101.

In this specification, "natural air delivery" means delivering air from the outside of equipment to the equipment without relying on motive power. That is, the natural air delivery mechanism W2 delivers air to the display device 30 without using the exhaust fan 17.

The natural air delivery mechanism W2 includes the ventilation hole 101, and the flow passage 10 through which the branch flow F2 flows when the exhaust fan 17 is operating.

Since the ventilation hole 101 is formed in the wall 5 which separates between the inside of the cockpit 2 and the behind-the-wall space 14, air inside the cockpit 2 flows into the behind-the-wall space 14 through the ventilation hole 101 (see the arrow F3) due to the differential pressure $(P_H-P_L)$ between the inside and the outside of the cockpit 2. The air flowing in this case is air which is present in the leg room inside the cockpit 2 and has a relatively low temperature inside the cockpit 2. The display device 30 is cooled by being supplied with this air.

In FIG. 2, the air delivery route of the natural air delivery mechanism W2 is indicated by the dashed arrows.

The air (F3) having flowed from a part lower than the backward part 52 through the ventilation hole 101 into the behind-the-wall space 14 is directly suctioned into the casing 30A by the built-in fan 33, and cools the display device 30 before being discharged to the outside of the casing 30A. This exhaust is guided to the flow passage 10 so as to spread from the exhaust opening of the casing 30A to the surrounding area, and flows through the flow passage 10 toward the discharge ports 9. As with the main flow F1 of air-conditioning exhaust, the air (F3) is discharged through the airflow ports 11 to the underfloor space 12.

Even if a part of the exhaust from the casing 30A is suctioned by the built-in fan 33, heat retention in the behind-the-wall space 14 can be prevented since low-temperature air is supplied through the ventilation hole 101.

According to this embodiment, even if the forced air delivery mechanism W1 malfunctions due to failure of the exhaust fan 17, it is possible to maintain the display device 30 below its allowable temperature by the natural air delivery mechanism W2 which delivers air through the ventilation hole 101 to the display device 30.

According to the natural air delivery mechanism W2 which functions on the basis of the differential pressure between the inside and the outside of the cockpit 2, it is not necessary to control so as to excessively increase the volume of air upon breakdown of the exhaust fan 17. Thus, the display device 30 can be cooled efficiently and reliably.

When the exhaust fan 17 is operating, i.e., when the forced air delivery mechanism W1 is functioning, air inside the cockpit 2 also flows through the ventilation hole 101 into the behind-the-wall space 14 due to the differential pressure, and is supplied to the display device 30. This air (F3) also contributes to cooling.

The air (F3) having flowed in through the ventilation hole 101 joins the branch flow F2 of air-conditioning exhaust, and is discharged through the duct 16.

Since air inside the cockpit 2 can be suctioned through the ventilation hole 101 to which the route distance from the exhaust fan 17 is shorter than the route distance of the main flow F1, a volume of air in the forced air delivery route can be secured.

Other than breakdown of the exhaust fan 17, a decrease in volume of air of the exhaust fan 17, damage of the duct 16, etc. are likely to cause malfunction of the forced air delivery mechanism W1. In that case, even if the forced air delivery mechanism W1 alone cannot maintain the display device 30 below its allowable temperature, the natural air delivery mechanism W2 can maintain the display device 30 below its allowable temperature.

In this embodiment, the flow passage 10, which is one section of the air delivery route (dot-and-dash line of FIG. 1) of the forced air delivery mechanism W1 and connects the main flow F1 and the behind-the-wall space 14 with each other, is also used as one section of the air delivery route of the natural air delivery mechanism W2. The air (F3) having flowed through the ventilation hole 101 into the behind-the-wall space 14 flows through the flow passage 10, through which no branch flow F2 is flowing due to breakdown of the exhaust fan 17, in the reverse direction from the branch flow F2. Thus, using the flow passage 10 for the natural air delivery mechanism W2 as well, it is possible to provide the natural air delivery mechanism W2 simply by drilling the ventilation hole 101 putting in communication the behind-the-wall space 14 and the inside of the cockpit 2 with one another.

The natural air delivery mechanism W2 delivers air to the display device 30 at such a flow rate as required for maintaining the display device 30 below its allowable temperature on the basis of the differential pressure $(P_H-P_L)$ between the inside and the outside of the cockpit 2.

The required flow rate can be determined on the basis of the differential pressure between the inside and the outside of the cockpit 2, the amount of heat generation and the allowable temperature of the display device 30, time for which the display device 30 needs to be maintained below the allowable temperature, etc.

The opening area of the ventilation hole 101 can be determined as follows, for example, using the differential pressure $(P_H-P_L)$ between the inside and the outside of the cockpit 2 and the flow rate Q of cooling air required for maintaining the display device 30 below its allowable temperature.

First, the required flow velocity v is obtained by the following formula:

$$P_H - P_L = \zeta \frac{\rho}{2} v^2 \qquad \text{[Formula 1]}$$

$$v = \sqrt{\frac{2(P_H - P_L)}{\zeta \rho}}$$

where $\zeta$ is a pressure loss coefficient and $\rho$ is an air density.

From the obtained flow velocity v and the required flow rate Q, the opening area A of the ventilation hole 101 is obtained as follows:

$$A \geq \frac{Q}{v} \qquad \text{[Formula 2]}$$

The configurations presented in the above embodiment can be selectively adopted or modified into other configurations within the spirit of the present invention.

The air delivery route of the forced air delivery mechanism W1 and the air delivery route of the natural air delivery mechanism W2 are not limited to those of the above embodiment, and these routes may be independent of each other.

The routes of the forced air delivery mechanism W1 and the natural air delivery mechanism W2 shown in the above embodiment are mere examples, and both routes can be appropriately set with a smooth air flow taken into account.

Moreover, the present invention can be used for cooling various pieces of equipment fitted in the cockpit 2 other than the display device 30.

In the case where a flow of air created by the exhaust fan alone can cool the equipment, the equipment does not have to include a cooling fan.

In the above embodiment, it is also possible to form a slit instead of the ventilation hole 101, or to substitute the ventilation hole 101 with a clearance between members.

The positions of such ventilation openings (the ventilation hole 101, the slit, and the clearance) can be determined such that air having a relatively low temperature inside the cockpit 2 flows in therethrough.

What is claimed is:

1. An aircraft comprising:
a cockpit, the inside of which is pressurized;
equipment which is at least partially disposed on the outside of the cockpit where the pressure is lower than the inside of the cockpit;
a forced air delivery mechanism which discharges air from a peripheral space of the equipment on the outside of the cockpit by an exhaust fan in order to supply a branch flow divided from a main flow of air-conditioning exhaust, which has air-conditioned the inside of the cockpit, as cooling air to the equipment; and
a natural air delivery mechanism which uses a differential pressure between the inside of the cockpit and the outside of the cockpit to supply air inside the cockpit as cooling air to the equipment through a ventilation opening putting in communication the peripheral space and the inside of the cockpit with one another.

2. The aircraft according to claim 1, wherein, even if the forced air delivery mechanism malfunctions, air is delivered to the equipment by the natural air delivery mechanism.

3. The aircraft according to claim 1, further comprising a flow passage which connects the main flow and the peripheral space with each other, wherein, when the exhaust fan is operating, the branch flow divided from the main flow flows through the flow passage and, when the exhaust fan is down, air in the peripheral space flows through the flow passage toward the main flow.

4. The aircraft according to claim 1, wherein
the main flow flows toward an underfloor space which is on the outside of the cockpit, and
the branch flow flows via the peripheral space into the underfloor space where the exhaust fan is located.

5. The aircraft according to claim 1, wherein the ventilation opening is located at a level lower than half the height of the inside of the cockpit.

6. The aircraft according to claim 1, wherein the ventilation opening is formed in a wall which separates between the inside of the cockpit and the peripheral space.

7. The aircraft according to claim 6, wherein:
the wall includes an upright part rising from the front end of a floor and a backward part extending backward from the upper end of the upright part, the floor defining the inside of the cockpit together with the wall; and
the ventilation hole penetrates the backward part in the thickness direction.

8. The aircraft according to claim 1, wherein the equipment includes a cooling fan which discharges heat of the equipment to the peripheral space.

9. The aircraft according to claim 8, wherein the ventilation opening is located in the vicinity of a suction opening of the equipment through which air is suctioned from the peripheral space by the cooling fan.

10. The aircraft according to claim 1, wherein the equipment is a display device which displays information required for flight of the aircraft.

* * * * *